(12) United States Patent
Lewis et al.

(10) Patent No.: US 7,424,705 B2
(45) Date of Patent: Sep. 9, 2008

(54) DYNAMIC MANAGEMENT OF COMPILED CODE

(75) Inventors: Brian T. Lewis, Palo Alto, CA (US); James M. Stichnoth, San Jose, CA (US); Dong-Yuan Chen, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 910 days.

(21) Appl. No.: 10/799,467

(22) Filed: Mar. 11, 2004

(65) Prior Publication Data

US 2005/0204349 A1    Sep. 15, 2005

(51) Int. Cl.
*G06F 9/45*    (2006.01)

(52) U.S. Cl. ..................................................... 717/148

(58) Field of Classification Search .................. 717/148
See application file for complete search history.

(56) References Cited

U.S. PATENT DOCUMENTS

| | | | | |
|---|---|---|---|---|
| 6,151,703 A | * | 11/2000 | Crelier | ........................ 717/136 |
| 6,289,504 B1 | * | 9/2001 | Cierniak et al. | ............. 717/148 |
| 6,473,794 B1 | * | 10/2002 | Guheen et al. | .............. 709/223 |

\* cited by examiner

*Primary Examiner*—John Chavis
(74) *Attorney, Agent, or Firm*—Trop, Pruner & Hu, P.C.

(57) ABSTRACT

Disclosed are a method, apparatus and system for dynamically managing layout of compiled code in a managed runtime environment. Profile feedback is generated during runtime, based on hardware event data that is gathered during runtime. A code manager dynamically relocates compiled code to reduce miss events based on the profile feedback. The code manager may also relocate virtual method tables in a virtual table region in order to reduce data miss events. The method does not require a prior run of an application program because profile feedback is based on event data that is tracked by hardware during execution of the software application and is not based on instrumented code.

56 Claims, 7 Drawing Sheets

DYNAMIC MANAGEMENT OF COMPILED CODE

BACKGROUND

1. Technical Field

The present disclosure relates generally to information processing systems and, more specifically, to managing layout of program elements in managed runtime environments.

2. Background Art

Modem platform-independent high-level programming languages such as Java and C# have gained significant market presence, especially for network-based applications. Typically, programs written in these languages execute in a managed runtime environment (MRE) that provides automatic memory management, type management, threads and synchronization, and dynamic loading facilities.

MREs typically support just-in-time compilation. Programs written in high-level programming languages such as Java and C# typically are first compiled to codes in a platform-neutral distribution format called bytecode. For example, a Java MRE may support Java class files that contain Java virtual machine language bytecode instructions. The compiled bytecode typically is not directly run on a platform.

While an MRE may directly interpret bytecodes, this is not typically done unless memory is exceedingly limited. MRE interpretation of bytecodes may significantly reduce performance. Instead, an MRE typically includes one or more just-in-time ("JIT") compilers that translates on demand, an application's bytecode instructions into native instructions for the processor on which the MRE is executing. The native instructions produced by a JIT for each compiled method are placed in a compiled code region.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method, apparatus and system for dynamically managing, without instrumented profile information, program elements such that certain frequently-accessed elements are placed near each other.

DETAILED DESCRIPTION

Described herein are selected embodiments of an apparatus, system and methods for dynamically managing the layout of program elements based on hardware-generated runtime profile information. In the following description, numerous specific details such as types of virtual machines, programming languages, specific compilers, and order of control flow for operations of a method have been set forth to provide a more thorough understanding of the present invention. One skilled in the art will appreciate, however, that the invention may be practiced without such specific details. Additionally, some well-known structures, circuits, and the like have not been shown in detail to avoid unnecessarily obscuring the present invention.

Figure 1:
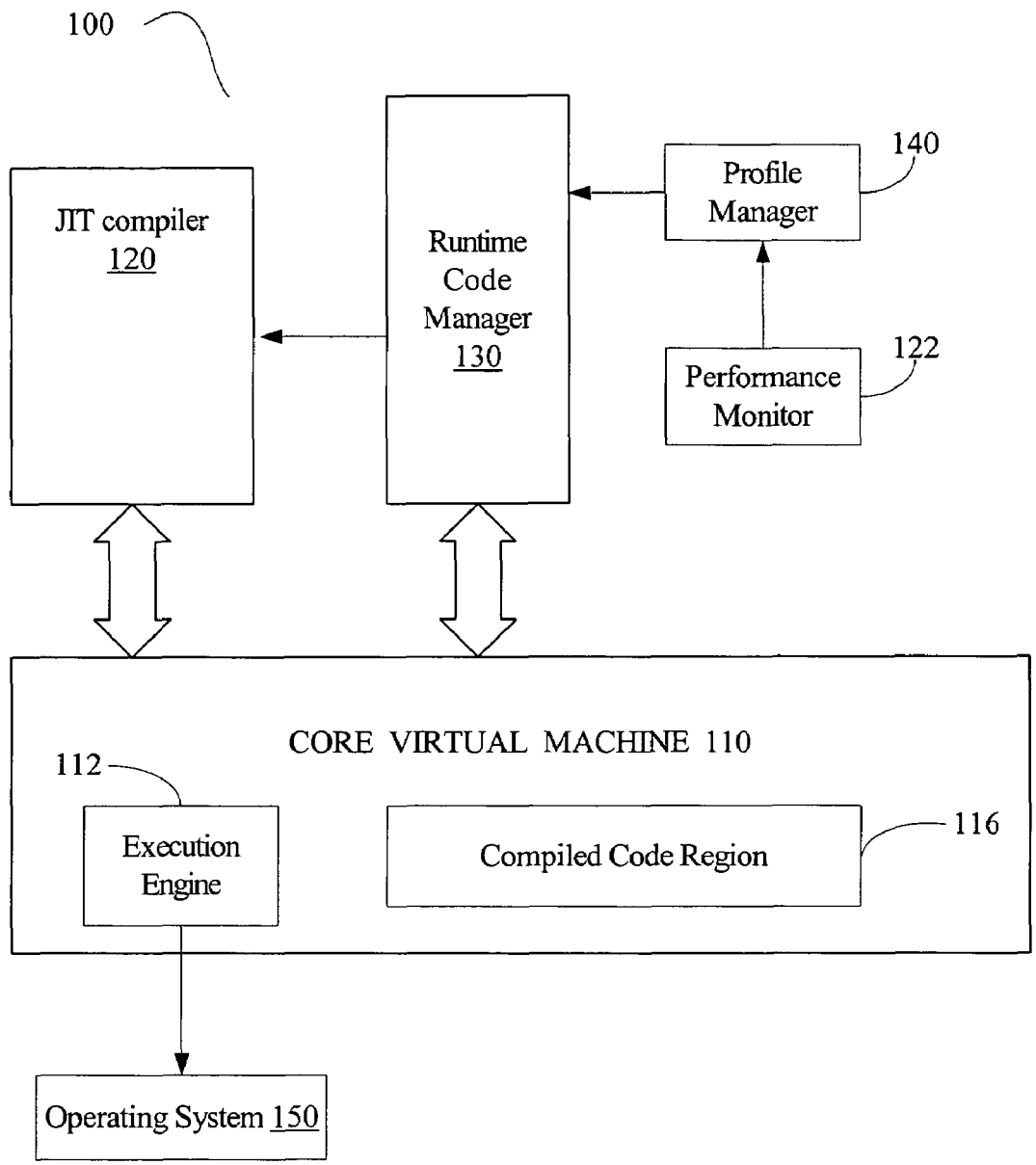
FIG. 1 is block diagram illustrating at least one embodiment of a managed runtime environment capable of dynamically managing program elements through the use of hardware-monitored profile information.

FIG. 1 depicts an example managed runtime environment ("MRE") 100 capable of dynamically performing feedback-based management of program elements, where the feedback is provided by performance-monitoring hardware 122 rather than instrumented code. Each MRE 100 runs on a processor with its own instruction set and an operating system, such as operating system 150. The MRE 100 dynamically loads and executes code that is delivered to it in the portable bytecode format. This means that the MRE 100 converts the bytecodes into native instructions through interpretation or compilation.

The MRE 100 includes a core virtual machine ("VM") 110 capable of interpreting bytecodes into instructions understood by the processor on which the MRE 100 is running. For at least one embodiment of a virtual machine for Java programs, the core VM 110 is a Java Virtual Machine (JVM). For at least on other embodiment, the core VM 110 is a Common Language Infrastructure (CLI) For C# programs.

The VM 110 accepts a platform-independent bytecode and then either interprets the bytecode into instructions understandable by the underlying processor or compiles the bytecode, using a JIT compiler 120, into a native code that is stored in a compiled code region 116.

FIG. 1 illustrates that the core VM 110 includes an execution engine 112. The execution engine 112 may directly interpret the bytecodes to execute them.

FIG. 1 illustrates that MRE 100 also includes ajust-in-time (JIT) compiler 120. Instead of using the relatively slower interpretation provided by the execution engine 112, the MRE 100 may execute native code generated by the JIT compiler 120. The first time a method is invoked, the JIT compiler 120 compiles the bytecode of the given method into a native code of the processor on which the MRE 100 is executing.

FIG. 1 illustrates that the core VM 110 includes a compiled code region 116. A native code occupies memory space in the compiled code region 116. Although not shown, one of skill in the art will recognize that the VM 110 may include additional runtime memory areas including a heap, program counter registers, stacks, virtual method tables, and the like.

The execution engine 112 may execute later calls to a method by re-using stored native code, if the native code of the method has not been evicted from the compiled code region 116. Executing an application via compiled native code stored in the compiled code region 116 is much faster than executing the same code through JVM-interpreted instructions. This is because interpretation of bytecodes by a virtual machine usually imposes a performance penalty for the execution of a bytecode because of the large runtime overhead required. That is, the extra layer of the interpreter between the application and the operating system 150 utilizes a significant amount of the platform's execution resources.

Placement of compiled methods in the compiled code region 116 occurs dynamically—methods are compiled as needed. Also, methods may be recompiled to improve their performance. Furthermore, new classes can be loaded (and unloaded at runtime). This dynamic nature of compiled method placement in the compiled code region 116 usually has the result that compiled code for calling methods is not necessarily placed in close proximity to callee methods.

In general, code for applications, especially large applications, may occupy many virtual memory pages. If control jumps from place to place in the compiled code region 116 frequently, instruction TLB (translation lookaside buffer) and instruction cache misses are likely to occur more frequently. Space in the compiled code region 116 is limited and efficient use of the compiled code region 116 is therefore desirable.

FIG. 1 illustrates that the MRE 100 further includes a runtime code manager 130. The runtime code manager 130 dynamically manages the layout of compiled native codes within the compiled code region 116. The runtime code manager 130 utilizes runtime event information provided by a hardware module, referred to herein as a performance monitor 122, to determine that compiled codes should be reorganized and to determine the layout for re-organized native codes.

For at least one embodiment, runtime event information collected by the performance monitor 122 is forwarded to a profile manager 140. For at least one embodiment, the profile manager 140 is implemented as a software module. The profile manager 140 may process runtime event information received from the performance monitor 122 to generate profile information that is forwarded to the runtime code manager 130.

Accordingly, the MRE 100 illustrated in FIG. 1 includes a performance monitor 122. For at least one embodiment, the performance monitor 122 tracks and gathers hardware event information. The event information may include information concerning the execution of methods during run-time and is, thus, dynamically generated. The event information may also include, for at least one embodiment, information concerning access to virtual method tables during run-time. The dynamic event information is generated by hardware during a current execution of the application software. That is, the event information reflects actual real time behavior during current execution of the application program and is not based on information generated during a prior instrumented run of the application program.

For at least one embodiment, the performance monitor 122 tracks and records performance events that occur during code execution. This information regarding run-time performance events is referred to herein as event information. Event information may include instruction miss information. Instruction miss information may include information regarding instruction cache misses and ITLB misses. Instruction miss information may include the instruction address for each recorded instruction miss event.

The performance monitor 122 may also track, for at least one embodiment, the frequency of method invocation and the relationship between invoked and calling methods. Again, the tracked information is hardware event information, based on hardware tracking of real time program behavior during a current run of the program. The hardware event information is not based upon a prior execution of instrumented program code.

For at least one embodiment, the performance monitor 122 may also track information related to data misses in the virtual method tables. This type of event information is referred to herein as data miss information. Virtual method tables (vtables) are accessed on each method invocation. These virtual method tables are created for each class and they hold pointers to the code for each method of the class. The vtables are allocated in a vtable region. Because vtables are data, accessing them can trigger data cache and data TLB misses.

The tracking of event information by the performance monitor 122 may be implemented in any of several manners. For each of these embodiments, however, the same observation is true: the tracking performed by the performance monitor 122 is based on runtime hardware monitoring during current execution of the application program and does not incorporate the use of instrumented software code. Nor does the tracking of event information involve, for at least one embodiment, call stack sampling wherein the call stack is recorded to build a profile of method calls.

For at least one embodiment, the performance monitor 122 tracks hardware event information continuously during execution of an application program. For at least one other embodiment, the performance monitor 122 only tracks hardware event information periodically during execution of the application program, and is inactive between tracking periods.

For at least one embodiment, the performance monitor 122 may track any combination of one or more of the following types of event information. The performance monitor 122 may track the number of miss events such as instruction cache misses and/or ITLB misses. For each miss event, the performance monitor 122 records the instruction address that caused the event.

The performance monitor 122 may also gather information that enables the profile manger 140 to track "hot" methods. "Hot" methods are those methods that utilize a relatively large amount of processing resources. For example, "hot" methods may involve a relatively large number of executed calls. That is, a callee method may be "hot" if it is frequently called. Also, a caller method may be "hot" if it includes a relatively large number of executed calls. The threshold number of calls that indicates that a callee or caller method is "hot" may be configurable. For at least one other embodiment, "hot" methods may consume a relatively large number of execution cycles. Again, the threshold number of execution cycles that indicate a "hot" method may be configurable.

The performance monitor 122 may also gather information concerning the calling relationship between executed methods by tracking branch history information. Such information may be forwarded to the profile manager 140.

Event information collected by the performance monitor 122 is, for at least one embodiment, forwarded to the profile manager 140. The profile manager 140 receives the raw event information from the performance monitor 122 and processes it to generate profile information that is forwarded to the runtime code manager 130. Based on event information provided by the performance monitor 122, the profile manager 140 thus generates profile information that may be useful to the runtime code manager 130.

For at least one embodiment, for example, the profile manager 140 may utilize branch history information to maintain a dynamically computed call graph. The dynamically-maintained call graph may be generated by the profile manager 140 in any of several manners. The relationships between callee and caller methods can be determined from branch history information provided by the performance monitor 122. For an embodiment wherein the processor maintains branch information in a buffer, such as a branch trace buffer, the performance monitor 122 examines such buffer in order to determine the taken branches that include method calls. From this information, the callee-caller pairs may be identified and reflected in the call graph that is generated by the profile manger 140.

For at least one other embodiment, the processor may maintain a last branch record. Information regarding caller-callee method pairs may be provided to the profile manager 140 from the performance monitor 122 based on information in the last branch record. Again the profile manager 140 may utilize such information to generate the call graph.

Of course, branch taken information, including method calls, may be reflected in other manners for other embodiments. The examples provided herein should not be taken to be limiting. In any of the approaches outlined herein or that may be understood by one of skill in the art, the call graph generated by the profile manager 140 reflects the actual caller-callee behavior of the program as it runs.

For at least one embodiment, the performance monitor 122 also gathers data miss event information. This type of event information includes the number of data cache misses and data TLB misses related to vtable accesses. A miss address may be provided as part of the data miss event information. The miss address points into the vtable region. The miss address information, when provided to the profile manager 140, enables the profile manager 140 to determine which vtable was being accessed when the miss occurred. Based on such profile information provided by the profile manager 140, the code manager 130 may reorganize the vtable region in order to minimize data misses.

The runtime code manager 130 utilizes profile information provided by the profile manger 140 in order to perform layout reorganization processing for elements of the application program. The program elements that may be reorganized include compiled code blocks and vtables. Such reorganization processing may include 1) determining whether the compiled code region's 116 layout should be reorganized, 2) determining whether the virtual table region should be reorganized, and 3) determining the new layout.

Figure 2:
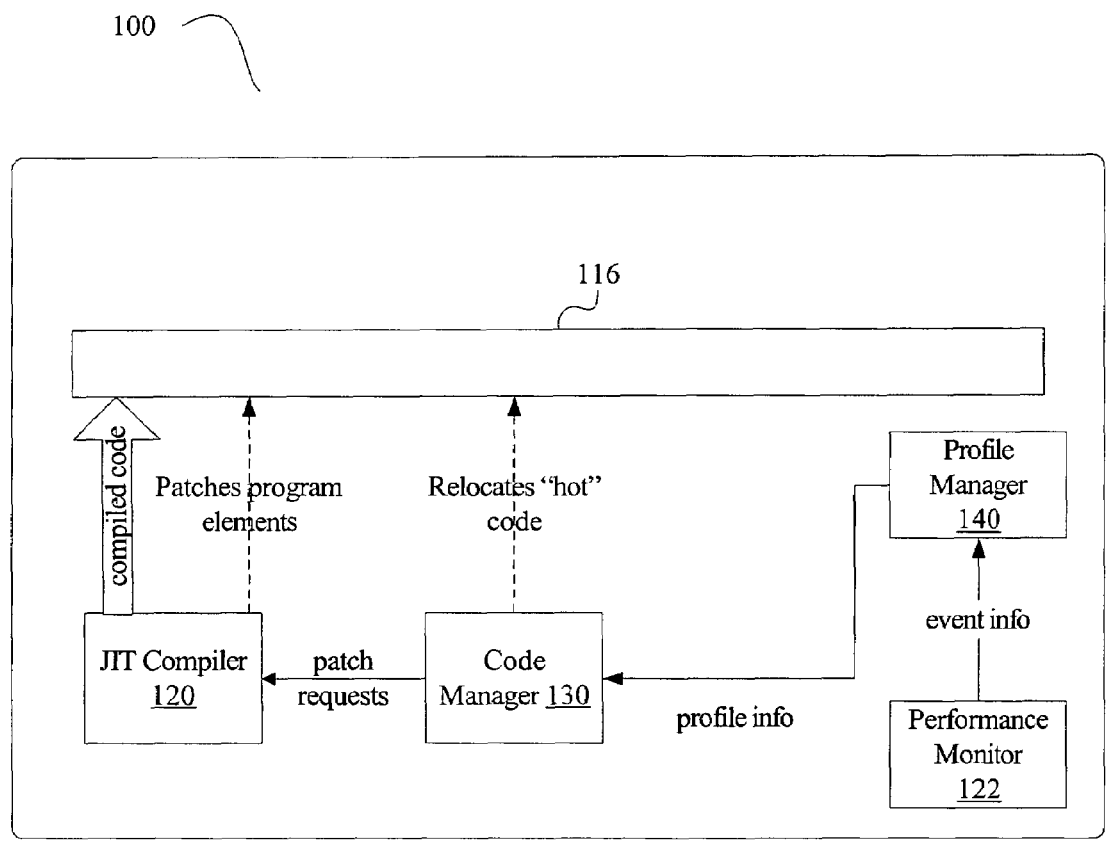
FIG. 2 is a data flow diagram illustrating data flow among components of at least one embodiment of a managed runtime environment that provides dynamic feedback-based management of program elements.

FIG. 2 is a data flow diagram that illustrates, generally, that the runtime code manager 130 utilizes profile information received from the profile manager 140 to manage the layout of program elements. As is explained above, for at least one embodiment the profile information is generated based on event information provided by the performance monitor 122. The example illustrated in FIG. 2 specifically illustrates reorganization of compiled code blocks within a compiled code region 116. Based on the event information provided by the performance monitor 122, the runtime code manager 130 relocates "hot" code when a reorganization is triggered. Such reorganization may be triggered, for example, when a threshold level of miss events for a hot code block are detected during runtime.

Utilizing profile information provided by the profile manager 140, the runtime code manager 130 moves "hot" blocks such that hot callee-caller method pairs are placed close to each other. Of course, such placement may displace other code blocks. For example, at least one embodiment of the runtime code manager 130 performs its relocation processing such that only relatively "cooler" blocks are displaced in order to avoid conflicting placement of hot code blocks. For other embodiments, however, both "hot" and "cooler" blocks may be displaced.

After relocating the "hot" code, the runtime code manager 130 issues one or more patch requests to the JIT compiler 120. That is, for each hot block that has been relocated by the runtime code manager 130, the relocated code and the displaced code, as well as any code that refers to them, may need to be updated to reflect new addresses. The JIT compiler 120, upon receiving a patch request, updates addresses, constants and other data in the relocated compiled code block to reflect its new location. This updating allows calls to the relocated compiled code block to be processed normally, without generating a trap.

Although not specifically illustrated in FIG. 2, other updating efforts may be performed by the virtual machine 110 (FIG. 1). For example, the virtual machine 110 may update the call stack and virtual method tables to reflect the new location of relocated code block(s).

Figure 3:
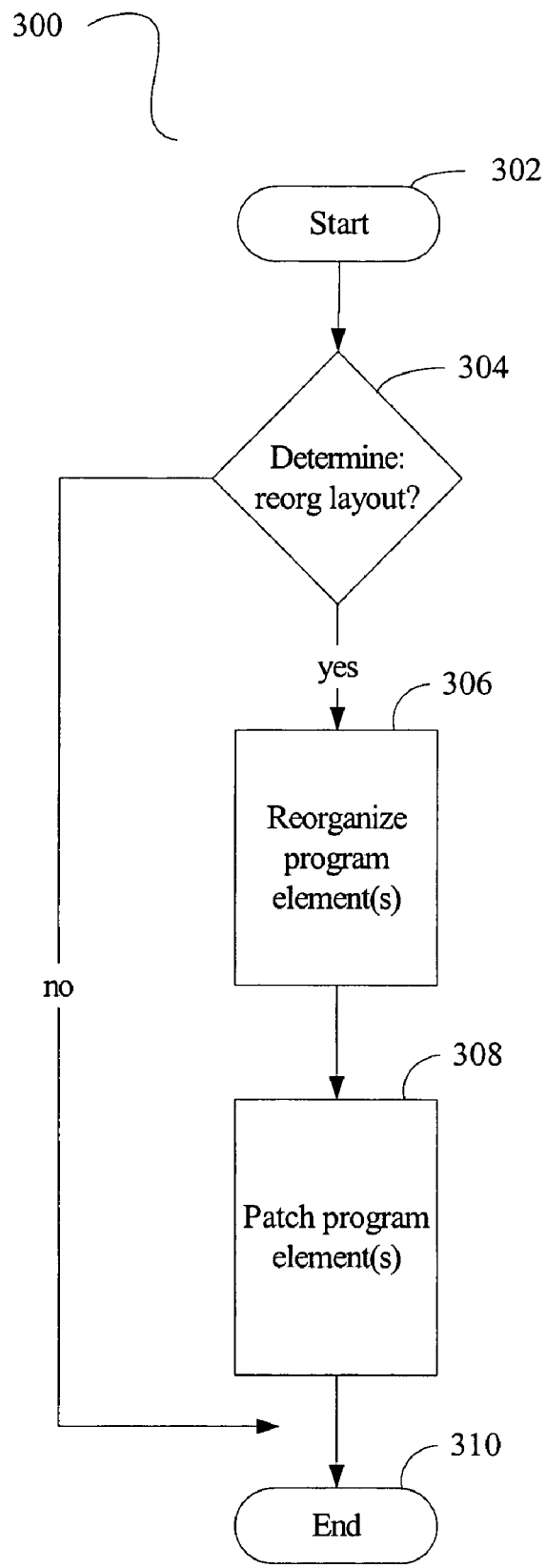
FIG. 3 is a flowchart illustrating a method of performing dynamic management of one or more program elements.

FIG. 3 is a flowchart illustrating a method 300 for dynamically relocating a program element, such as a compiled code block or a vtable, based on hardware-based profile information. For at least one embodiment, the method 300 is performed by a managed runtime environment ("MRE"), such as MRE 100 illustrated in FIG. 1.

FIG. 3 illustrates that processing for the method 300 begins at block 302 and proceeds to block 304. At block 304 it is determined whether the layout of one or more program elements should be reorganized. If so, then processing proceeds to block 306. Otherwise, processing ends at block 310.

At block 306, layout of program elements is reorganized. In particular, for at least one embodiment, layout for the compiled code region 116 (FIGS. 1 and 2) is re-organized in order to reduce the number of ITLB misses and instruction cache misses encountered during execution of an application program.

For at least one embodiment, virtual method tables are also reorganized at block 306. That is, at block 306 the layout of data (in the form of virtual method tables), as well as code, may be reorganized. Since these vtables are accessed frequently during method invocation, allocating the vtables in such a way that the most frequently accessed vtables are close together may reduce data cache and TLB misses.

Alternatively, the vtable reorganization may be performed separately from the code reorganization performed at block 306. For such alternative embodiment, the method 300 is run separately for dynamic vtable management, and the separate vtable reorganization is triggered when the determination at block 304 indicates that a vtable miss rate exceeds a predetermined threshold.

From block 306, processing proceeds to block 308. At block 308, address references in relocated program elements, and other program elements that refer to them, are patched to reflect the new address locations as a result of the relocation that took place at block 306. FIG. 3 illustrates that, after patching, processing ends at block 310.

The method 300 may be performed as a loop during execution of an application, such that execution of the method 300 loops back to begin at block 302 after processing for a previous iteration of the method 300 has ended at block 310. Accordingly, as the application program executes and its behavior changes, the compiled code region 116 (FIGS. 1 and 2) and/or the vtable region is reorganized as necessary to keep frequently-accessed program elements in near proximity to other frequently-accessed program elements of the same type.

Figure 4:
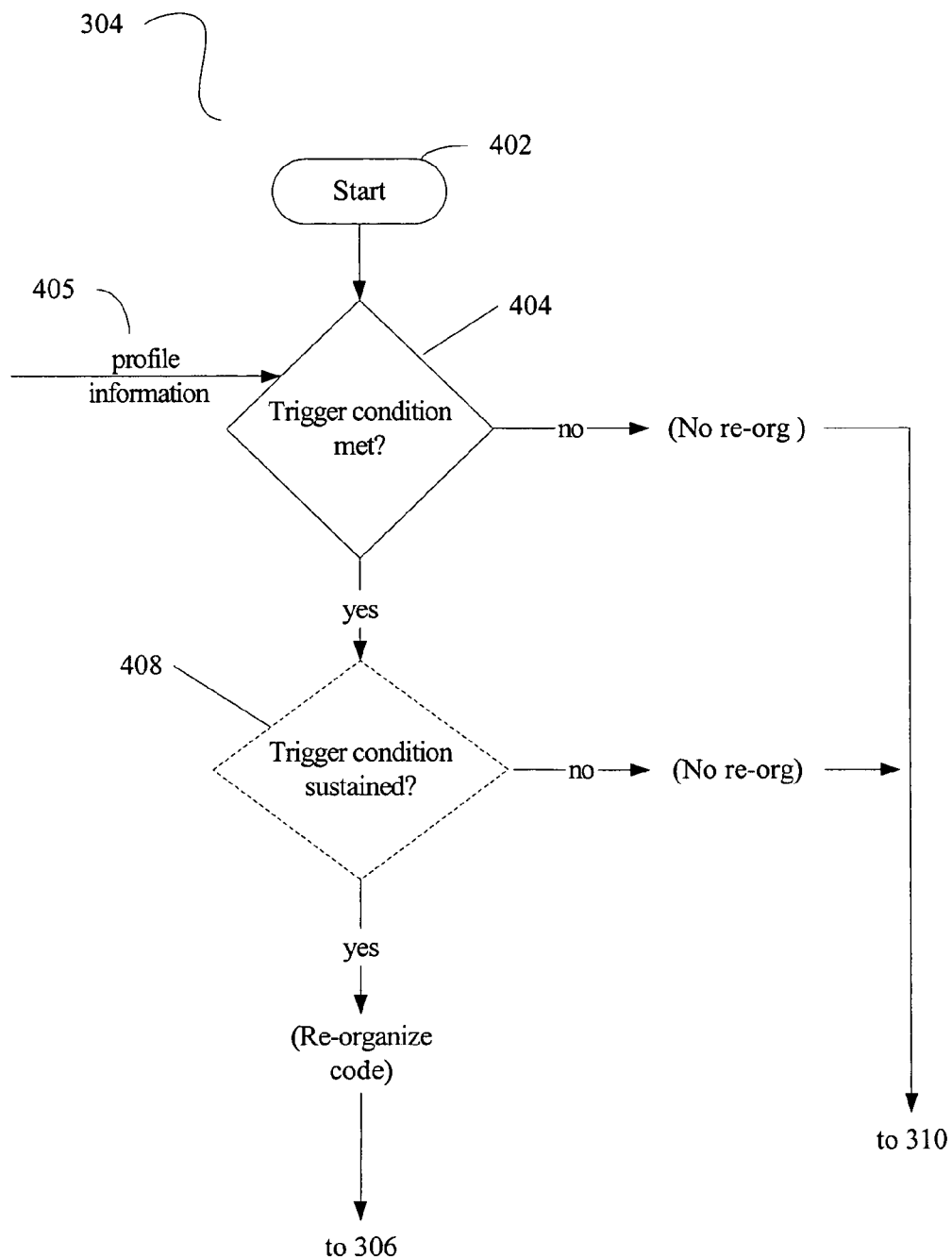
FIG. 4 is a flowchart illustrating further detail for at least one embodiment of a method for determining if reorganization for a program element should be performed.

FIG. 4 is a flowchart illustrating further detail for at least one embodiment of the reorganization determination illustrated at block 304 of FIG. 3. For at least one embodiment, a runtime code manager, such as runtime code manager 130 illustrated in FIGS. 1 and 2, performs the determination 304.

FIG. 4 illustrates that processing for the method 304 begins at block 402 and proceeds to block 404. At block 404, it is determined, based on the profile information 405 provided by the profile manager (140, FIGS. 1 and 2), whether a reorganization trigger condition is met. For at least one embodiment, such determination 404 checks whether a triggering metric meets a predetermined criterion (or set of criteria) during execution of the application program. The triggering metric may be a simple event count. For example, the performance monitor 122 may track the number of times a certain performance event occurs during execution of the application program. For at least one embodiment, for example, the performance monitor 122 may track the number of instruction miss events and/or data miss events. Such event data may, as is explained above, be provided to the profile manager 140, which processes the data to generate the profile data 405 utilized in the determination at block 404.

For other embodiments, the triggering condition may be defined as an arithmetic or algorithmic function that takes into account multiple performance events during execution of the application program. Such function may take into account more than one source of input. Such inputs may include hardware metrics gathered by the performance monitor 122, but may also include other hardware or software input sources that are not necessarily generated by the performance monitor 122.

Thus, the reorganization trigger condition, which is checked at block 404, may be a simple count value. Alternatively, a set of criteria may be used to determine when or whether to re-organization should be triggered at block 404.

The trigger condition is a predetermined value, and may be configurable. If it is determined, at block 404, that the trigger condition has been met, then processing proceeds to block 408. Otherwise, it is determined that no code reorganization is appropriate at the current time, and processing proceeds to block 310 (see FIG. 3).

If it is determined at block 404 that the trigger condition has been met, then it may be determined that a reorganization is appropriate at the current time, and processing may proceed to block 306.

However, FIG. 4 illustrates that optional processing 408 may be performed in order to determine whether a reorganization is appropriate. For such embodiments, processing may proceed from block 404 to block 408. The optional nature of block 408 is denoted with broken lines in FIG. 4.

At block 408, it is determined whether the trigger condition has been sustained for at least a predetermined amount of time. If not, it may be that the event or set of events measured at block 404 is transient, and does not warrant reorganization. For instance, during some phases of an application program's execution, many instruction miss events might occur, but for a short duration. Thus, transient misses may occur during phase changes during the program's execution.

Such situation may occur, for example, during initialization of some of the program's classes. Or, transient misses may occur when shifting from doing one kind of computation (say, for example, computing results) to another (say, for example, writing those results). In order to avoid reorganization based on such relatively fleeting phases of an application program's execution, the processing at block 408 determines whether the trigger condition has been sustained for at least a predetermined amount of time. If so, reorganization is warranted, and processing proceeds to block 306 (see FIG. 3). Otherwise, reorganization is not warranted, and processing proceeds to block 310 (see FIG. 3). In this manner, reorganization is delayed in the latter case, in order to avoid too-frequent reorganization of the compiled code region (and, for certain embodiments, the vtable region).

Figure 5:
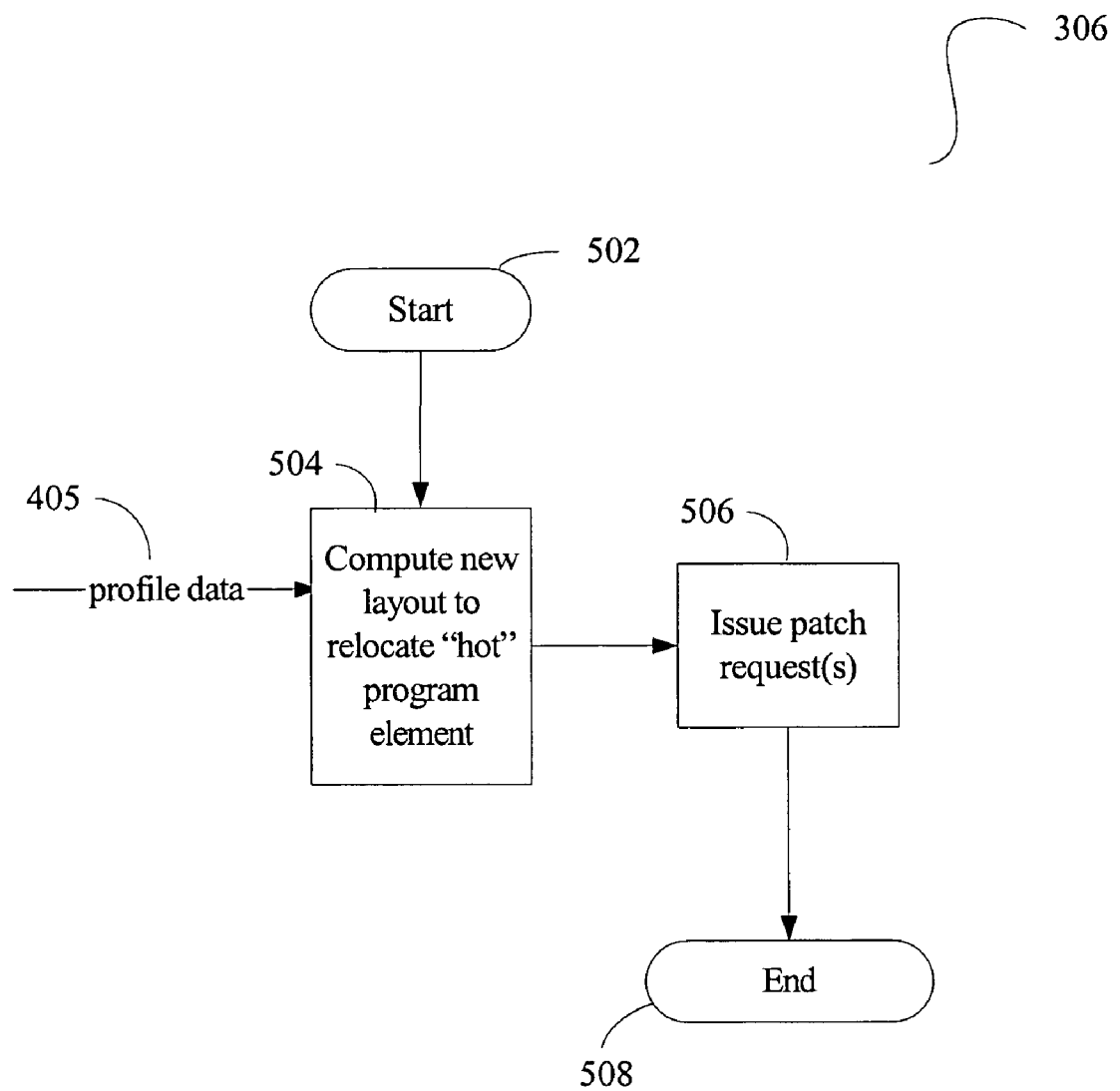
FIG. 5 is a flowchart illustrating at least one embodiment of a method for relocating a program element.

FIG. 5 is a flowchart illustrating further detail for at least one embodiment of dynamic code reorganization 306 as illustrated in FIG. 3. For at least one embodiment, a runtime code manager, such as runtime code manager 130 illustrated in FIGS. 1 and 2, performs the reorganization 306. As with the methods illustrated above, the FIG. 5 method 306 may be performed for the compiled code region 116 as well as for the vtable region.

FIG. 5 illustrates, generally, that the method 306 utilizes profile feedback 405, which is generated by profile manager 140 (FIGS. 1 and 2) during execution of an application program. As is stated above, the profile feedback 405 is generated based on event data gathered via hardware monitoring by the performance monitor 122 (FIGS. 1 and 2), and is not generated as a result of instrumented instructions. The profile information is thus generated during a current run of the application program.

Processing for the method 306 begins at block 502 and proceeds to block 504. At block 504 profile information 405 is utilized to reorganize the layout for the compiled code region 116 (FIGS. 1 and 2). Layout for the vtable region may also be reorganized at block 504.

At block 504 the profiling information 405 generated by the performance monitor (122, FIGS. 1 and 2) is utilized to place compiled code within the compiled code region (116, FIGS. 1 and 2) such that the number of instruction cache misses and ITLB misses are reduced. Similarly, the profile information 405 may be utilized to reorganize 504 the layout of the vtable region to reduce data cache and data TLB misses.

In reorganizing 504 layout, locality of reference is thus exploited. That is, compiled code blocks for "hot" callee-caller method pairs are placed near each other. Accordingly, the new layout reduces the number of memory pages accessed during program execution. Such layout may result in reduced ITLB misses and may also reduce the number of instruction cache misses. Similar benefits may result from modifying the layout of the vtable region to exploit locality of reference.

From block 504, processing proceeds to block 506. At block 506, patch requests are issued to the JIT compiler (see 120, FIGS. 1 and 2). A patch request is issued at block 506 for each program element that was moved at block 504, and for any program element that refers to a program element that was moved. These relocated program elements include any "hot" code blocks and/or vtables that were relocated, and also include any other program elements that were displaced by the relocated program elements.

The processing illustrated at block 506 of FIG. 5 assumes that the receiving module will patch the program elements as requested. While it has been stated that the receiving entity may be a JIT code compiler, at least for patching due to relocated code blocks, it will be understood that any other type of code manipulation logic may be utilized as well. For example, a garbage collection module may be utilized to perform patching due to relocated program elements.

A garbage collector typically operates on data objects but may also be utilized to reorder code. However, a garbage collector often is limited in the types of code blocks it is designed to move. For example, some garbage collection modules are only designed to patch "relocatable" code. In such approach, the garbage collector need not understand the details of the compiled code, but rather treats code blocks as movable units. This approach limits the type of code that the JIT compiler can emit because it imposes restrictions that make a code block "relocatable".

In contrast, for embodiments that utilize one or more JIT compilers 120 to patch relocated code modules, such relocation restrictions are often not necessary. Accordingly, utilization of a JIT compiler 120 patch code, rather than a garbage collection module, may allow for more sophisticated optimizations in the relocated code. This allows the JIT compiler 120 more flexibility in the types of compiled code it produces, allowing more flexibility to optimize the compiled code blocks.

In addition, for embodiments that utilize a JIT compiler 120 to patch relocated code blocks, the relocation may be performed independent of garbage collection. This allows the code patching to be performed on an "as-needed" basis rather than requiring that code patching occur only during periodic garbage collection. That is, it is not necessarily true that changes in optimal code layout will occur on the same schedule as garbage collection.

The monitoring for code relocation trigger events (see determination block 304 of FIG. 3) may be performed as part of a continuous loop during application execution, as described above. Thus, when the determination 304 evaluates as "true", the code relocation may be performed as needed, rather than being performed only when garbage collection occurs. Such approach may be beneficial for those application programs for which it is advantageous to perform compiled code relocation (and, for some embodiments, vtable relocation) more frequently than garbage collection occurs.

FIG. 5 illustrates that, after patch requests are issued at block 506, processing ends at block 508.

Figure 6:
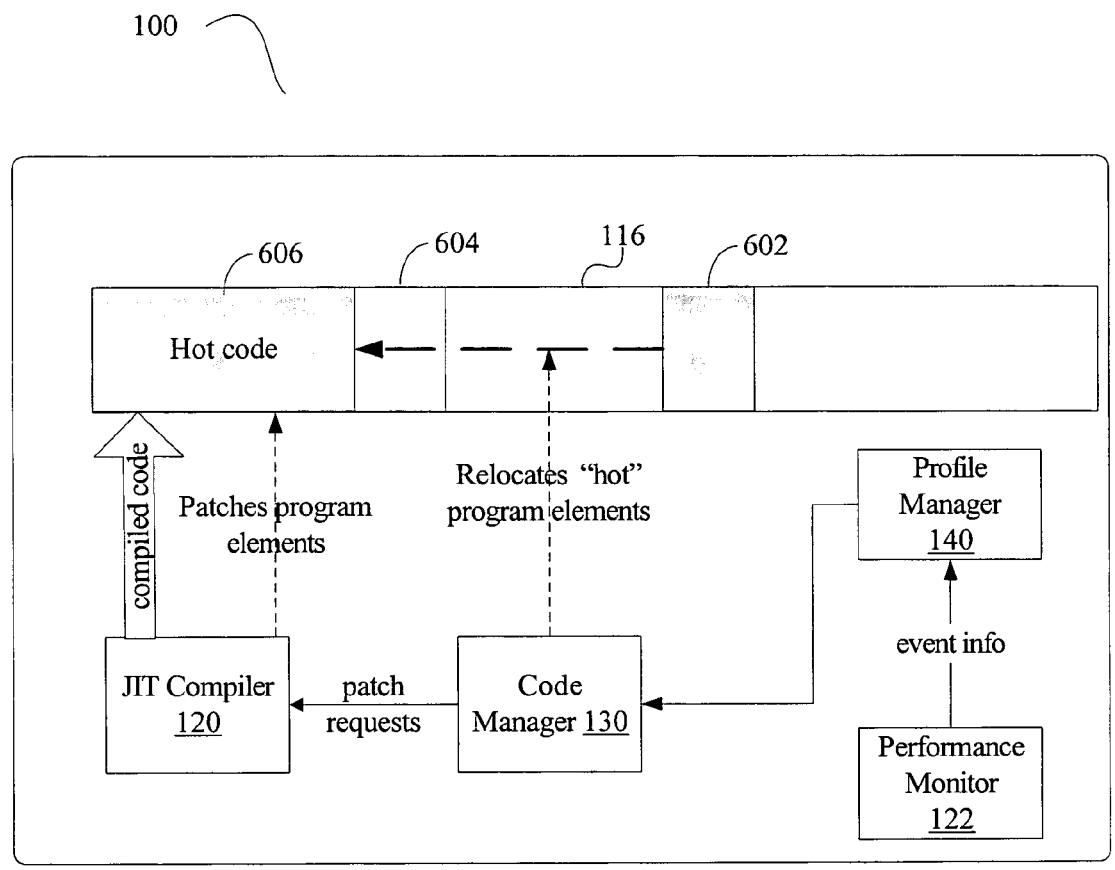
FIG. 6 is a data flow diagram illustrating an example of dynamic compiled code relocation according to at least one embodiment of disclosed techniques.

FIG. 6, in conjunction with FIG. 3, illustrates that, at block 306, layout of the compiled code region 116 is modified to move a hot block 602 to be adjacent to other hot code 606. For example, if a caller method within the hot code block 606 calls method 602 often, and such call generates frequent miss events, then the code manager 130 may relocate 306 compiled code 602 for the callee method in order to avoid such miss events. Although not so illustrated in FIG. 6, it may be the case that both the caller and callee method for a hot callee/caller pair are relocated.

FIG. 6 further illustrates that, for each of the code blocks relocated at block 306, the JIT compiler 120 patches 308 the relocated code and any code blocks that refer to the relocated code. Such patching 308 is accomplished for the relocated code block 602 as well as the displaced code block 604. In cases wherein the caller method is also relocated, the JIT compiler 120 patches code references for such block as well. Even in the case that the caller method is not relocated, the JIT compiler 120 patches the caller method to reflect the new address for the relocated callee code block.

For at least some embodiments, updates to a call stack and to the virtual method tables may also be performed as a result of layout reorganization for program elements at block 306. Although not illustrated in FIG. 6, such updates may be performed by the core virtual machine 110 (see FIG. 1).

During relocation of code blocks at 306, the code manager 130 may use a relocation algorithm to determine how to move the relocated code and the displaced code. For example, the displaced code block 604 may be moved slightly aside to make way for the relocated code block 602. For at least one embodiment, such approach includes moving all other intervening code blocks between the displaced code block 604 and the original location of code block 602. For at least one other embodiment, the relocated code block 602 and the displaced code block 604 are merely swapped.

As another example algorithm for relocation 306, the code manager 130 may utilize profile-guided code positioning to position the relocated code 602. For further information, an embodiment of profile-guided code positioning is described in K. Pettis and R. Hansen, Profile-Guided Code Positioning, Proceedings of the ACM SIGPLAN '90 CONFERENCE ON PROGRAMMING LANGUAGE DESIGN AND IMPLEMENTATION, 1990, New York. Generally, profile-guided code positioning selects the heaviest-weighted edges of an undirected call graph to identify procedure pairs (referred to above as callee-caller pairs) that should be laid out near each other.

Of course, other placement algorithms may be utilized by the code manager 130 in order to determine layout reorganization at block 306. The examples provided herein should not, therefore, be taken to be limiting.

In sum, the discussion above discloses a system, apparatus and methods for using profile information based on information provided by a hardware performance monitoring unit to improve application performance by dynamically managing code, including compiled code and virtual method tables, of applications during execution in a managed runtime environment. The method 300 illustrated in FIG. 3 may be performed by a managed runtime environment 100 (FIG. 1). More specifically, event information may be tracked during runtime by a hardware performance monitor (see 122, FIGS. 1 and 2). Such event information may be provided to a profile manager that processes the event data to generate profile information. The profile information (see 405, FIGS. 4 and 5) may be utilized by a code manager to determine (see 304, FIG. 3; see also FIG. 4) whether a reorganization of compiled code within a compiled code region 116 (FIGS. 1, 2 and 6) is warranted. The profile information may also be utilized for vtable relocation processing. The code manager 130 may further utilize the profile information 405 to relocate code (see 306, FIG. 3; see also FIG. 5) when such reorganization is warranted. The code manager 130 may then issue (see 506, FIG. 5) patch requests to a JIT compiler 120 (FIGS. 1, 2 and 6). The JIT compiler 120 then patches code, in order to update address references, for relocated compiled code blocks and/or vtables.

Embodiments of the methods disclosed herein may be implemented in hardware, software, firmware, or a combination of such implementation approaches. Software embodiments of the methods may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this disclosure, a processing system includes any system that has a processor, such as, for example; a network processor, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the methods described herein are not limited in scope to any particular programming language. In any case, the language may be a compiled or interpreted language The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the actions described herein. Embodiments of the invention may also be considered to be implemented as a machine-readable storage medium, configured for use with a processing system, where the storage medium so configured causes the processing system to operate in a specific and predefined manner to perform the functions described herein.

Figure 7:
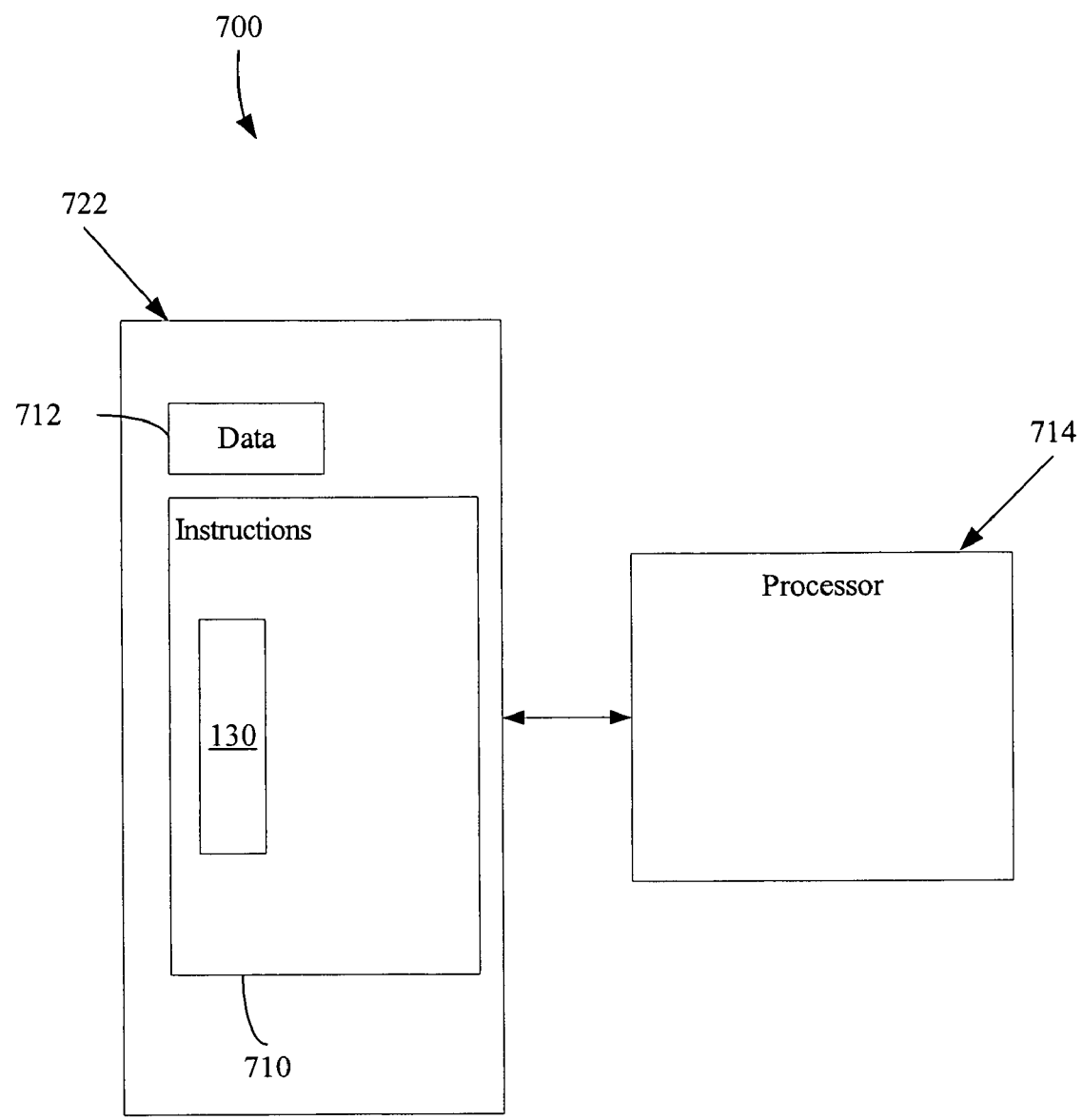
FIG. 7 is a block diagram illustrating at least one embodiment of a processing system capable of utilized disclosed techniques.

An example of one such type of processing system is shown in FIG. 7. System 700 may be used, for example, to execute dynamically manage layout based on hardware profile feedback, such as the embodiments described herein. System 700 is representative of processing systems, such as cellular telephones, personal digital assistants, portable video players, portable media players and other hand-held devices based on the Intel® XScale™ technology. System 700 is also representative of processing systems that include the Itanium® and Itanium® 2 microprocessors and the Pentium®, Pentium® Pro, Pentium® II, Pentium® III, Pentium® 4 microprocessors, all of which are available from Intel Corporation. Other systems (including personal computers (PCs) and servers having other microprocessors, engineering workstations, set-top boxes and the like) may also be used. At least one embodiment of system 700 may execute a version of the Windows™ operating system available from Microsoft Corporation, although other operating systems and graphical user interfaces, for example, may also be used.

Processing system 700 includes a memory 722 and a processor 714. Memory system 722 may store instructions 710 and data 712 for controlling the operation of the processor 714. Memory system 722 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 722 may store instructions 710 and/or data 712 represented by data signals that may be executed by the processor 714.

FIG. 7 illustrates that the instructions implementing embodiments of the methods 300 (FIG. 3), 400 (FIG. 4), and 500 (FIG. 5), may be logically grouped into various functional modules.

For example, as is stated above, instructions implementing the method 304 and 306, which are illustrated in FIGS. 4 and 5, respectively, may be performed as part of a runtime code manager 130. Similarly, code patching 308 illustrated in FIG. 3 may be performed by a JIT compiler 120. Also, generation of profile information 405 based on hardware-generated event data may be performed by a profile manager 140 (see FIGS. 1, 2, 4 and 5). The instructions 710 may thus include instructions that may implement a runtime code manager 130 and may also include instructions that implement a JIT compiler 120 and/or a profile manager 140.

In the preceding description, various aspects of an apparatus, system and methods for performing dynamic management of a compiled code region are disclosed. For purposes of explanation, specific numbers, examples, systems and configurations were set forth in order to provide a more thorough understanding. However, it is apparent to one skilled in the art that the described method and apparatus may be practiced without the specific details. It will be obvious to those skilled in the art that changes and modifications can be made without departing from the present invention in its broader aspects.

For example, embodiments of the methods 300 (FIG. 3), 304 (FIG. 4), and 306 (FIG. 5) disclosed herein have been illustrated as having a particular control flow. One of skill in the art will recognize that alternative processing order may be employed to achieve the functionality described herein. Similarly, certain operations are shown and described as a single functional block. Such operations may, in practice, be performed as a series of sub-operations.

Also, for example, the embodiments of an MRE 100 illustrated in FIGS. 1 and 2 illustrate only a single JIT compiler 120. However, one of skill in the art will realize that an MRE may include multiple JIT compilers. For such embodiments, the multiple JIT compilers may be involved in servicing patch requests.

While particular embodiments of the present invention have been shown and described, the appended claims are to encompass within their scope all such changes and modifications that fall within the true scope of the present invention.

What is claimed is:

1. A method comprising:
relocating a compiled code block associated with a software application;
wherein said relocating is performed responsive to hardware event information gathered during current execution of the software application; and
wherein said relocating is performed during current execution of the software application.

2. The method of claim 1, further comprising:
selecting the compiled code block responsive to occurrence of a trigger condition during current execution of the software application.

3. The method of claim 2, wherein:
the hardware event information indicates that the trigger condition has occurred during current execution of the software program.

4. The method of claim 2, wherein:
the trigger condition is a threshold number of hardware performance events.

5. The method of claim 4, wherein:
the trigger condition is a threshold number of instruction miss events.

6. The method of claim 2, wherein:
the trigger condition is a set of hardware criteria.

7. The method of claim 2, wherein:
the trigger condition is a set of hardware and software criteria.

8. The method of claim 1, further comprising:
selecting the compiled code block based on the compiled code block's resource utilization during current execution of the software application.

9. The method of claim 8, wherein:
the hardware event information reflects the compiled code block's resource utilization during current execution of the software program.

10. The method of claim 9, wherein:
the hardware event information further reflects the number of executed method calls performed by the compiled code block.

11. The method of claim 9, wherein:
the hardware event information further reflects the number of times the compiled code block has been called during execution of the software program.

12. The method of claim 9, wherein:
the hardware event information further reflects the number of execution cycles consumed during execution of the compiled code block.

13. The method of claim 1, further comprising:
relocating a virtual method table associated with the software application during current execution of the software application.

14. The method of claim 13, wherein:
said hardware event information includes data miss information.

15. The method of claim 1, wherein:
said relocating is performed on as as-needed basis independent of garbage collection.

16. The method of claim 1, wherein said relocating further comprises:
moving the compiled code block to a new location within a code region; and patching address references in the code region to reflect the new location of the compiled code block.

17. The method of claim 16, wherein:
patching address references further comprises patching address references such that invocation of the relocated compiled code does not generate a trap.

18. The method of claim 16, further comprising:
patching a call stack to reflect the new location.

19. The method of claim 16, further comprising:
patching a virtual method table to reflect the new location.

20. A method, comprising:
dynamically relocating a program element; and
invoking a just-in-time compiler to patch address references associated with the relocated program element.

21. The method of claim 20, wherein:
the program element is a compiled code block.

22. The method of claim 20, wherein:
the program element is a virtual method table.

23. The method of claim 20, further comprising:
generating hardware event information during current execution of a software program with which the program element is associated.

24. The method of claim 23, wherein dynamically relocating a program element further comprises:
determining whether to relocate the program element based on the hardware event information.

25. The method of claim 24, wherein determining whether to relocate the program element further comprises:
determining whether the hardware event information indicates that a trigger condition has been met.

26. The method of claim 24, wherein:
the program element is a compiled code block; and
determining whether to relocate the program element further comprises determining whether calls to the compiled code block have generated at least a predetermined number of instruction miss events.

27. The method of claim 24, wherein:
the program element is a virtual method table; and
determining whether to relocate the program element further comprises determining whether accesses to the virtual method table have generated at least a predetermined number of data miss events.

28. The method of claim 23, wherein dynamically relocating a program element further comprises:
determining a new location for the relocated program element based on the hardware event information.

29. The method of claim 23, wherein:
the hardware event information includes branch history information.

30. The method of claim 23, further comprising:
generating profile information based on the hardware event information.

31. The method of claim 30, wherein:
the profile information includes a call graph.

32. An article comprising:
a machine-readable storage medium having a plurality of machine accessible instructions, which if executed by a machine, cause the machine to perform operations comprising:
dynamically relocating a program element; and
invoking a just-in-time compiler to patch address references associated with the relocated program element.

33. The article of claim 32, wherein the storage medium has instructions, which if executed by a machine, cause the machine to further perform operations comprising:
generating hardware event information during current execution of a software program with which the program element is associated.

34. The article of claim 33, wherein the instructions that cause the machine to dynamically relocate a program element further include instructions, which if executed by a machine, cause the machine to further perform operations comprising:
determining whether to relocate the program element based on the hardware event information.

35. The article of claim 33, wherein the instructions that cause the machine to dynamically relocate a program element further include instructions, which if executed by a machine, cause the machine to further perform operations comprising:
determining a new location for the relocated program element based on the hardware event information.

36. The article of claim 34, wherein the instructions that cause the machine to determine whether to relocate the program element further include instructions, which if executed by a machine, cause the machine to perform operations comprising:
determining, based on the hardware event information, whether a trigger condition has been met during current execution of the software program.

37. The article of claim 36, wherein the instructions that cause the machine to determine whether a trigger condition has been met further include instructions, which if executed by a machine, cause the machine to perform operations comprising:
determining whether calls to the program element have generated at least a predetermined number of instruction miss events.

38. The article of claim 36, wherein the instructions that cause the machine to determine whether a trigger condition has been met further include instructions, which if executed by a machine, cause the machine to perform operations comprising:
determining whether accesses to the program element have generated at least a predetermined number of data miss events.

39. The article of claim 36, wherein the instructions that cause the machine to determine whether a trigger condition has been met further include instructions, which if executed by a machine, cause the machine to perform operations comprising:
determining whether execution of the program element has utilized at least a predetermined quantity of execution resources.

40. An apparatus, comprising:
a compiled code region to store compiled native codes; and
a code manager to dynamically modify layout of the compiled code region based on hardware event feedback.

41. The apparatus of claim 40, wherein:
the hardware event feedback is generated during current execution of a software program.

42. The apparatus of claim 40, wherein:
the code manager is further to determine, based on the feedback, whether the layout of the compiled code region should be modified.

43. The apparatus of claim 40, wherein:
the code manager is further to determine, based on the feedback, a new location for a compiled code block.

44. The apparatus of claim 40, further comprising:
code manipulation logic to patch address references in the compiled code region.

45. The apparatus of claim 40, further comprising:
a virtual method table region.

46. The apparatus of claim 45, wherein:
the code manager is further to dynamically modify layout of the virtual method table region based on hardware event feedback.

47. The apparatus of claim 46, wherein:
the code manager is further to determine, based on the feedback, whether the layout of the virtual method table region should be modified.

48. The apparatus of claim 46, wherein:
the code manager is further to determine, based on the feedback, a new location for a virtual method table.

49. A system comprising:
a processor; and
a memory, wherein the memory further comprises:
  a compiled code region;
  a code manager to dynamically manage layout of the compiled code region; and
  code manipulation logic to patch address references in the compiled code region.

50. The system of claim 49, further comprising:
a virtual method table region.

51. The system of claim 49, wherein:
the memory is a DRAM.

52. The system of claim 49, wherein:
the code manager is further to dynamically manage layout of the compiled code region based on dynamic hardware event information.

53. The system of claim 52, wherein:
the code manager is further to dynamically manage layout of the compiled code region based on dynamic hardware instruction miss information.

54. The system of claim 50, wherein:
the code manager is further to dynamically manage layout of the virtual method table region.

55. The system of claim 54, wherein:
the code manager is further to dynamically manage layout of the virtual method table region based on dynamic hardware event information.

56. The system of claim 55, wherein:
the code manager is further to dynamically manage layout of the virtual method table region based on dynamic hardware data miss information.

* * * * *